US010523694B2

(12) United States Patent
Hizkiev et al.

(10) Patent No.: US 10,523,694 B2
(45) Date of Patent: Dec. 31, 2019

(54) SYSTEM AND METHOD FOR INTERCEPTION OF MALICIOUS FILES

(71) Applicant: BITDAM LTD, Netanya (IL)

(72) Inventors: Maor Hizkiev, Tel-Aviv (IL); Liron Barak, Rishon Lezion (IL); Alex Livshiz, Rishon Lezion (IL); Ran Regenstreif, Tel-Aviv (IL)

(73) Assignee: BITDAM LTD, Netanya (IL)

( * ) Notice: Subject to any disclaimer, the term of this patent is extended or adjusted under 35 U.S.C. 154(b) by 338 days.

(21) Appl. No.: 15/592,211

(22) Filed: May 11, 2017

(65) Prior Publication Data

US 2018/0332059 A1 Nov. 15, 2018

(51) Int. Cl.
*H04L 29/06* (2006.01)
*G06F 21/56* (2013.01)
*G06F 21/53* (2013.01)

(52) U.S. Cl.
CPC .......... *H04L 63/1425* (2013.01); *G06F 21/53* (2013.01); *G06F 21/566* (2013.01); *H04L 63/1441* (2013.01); *G06F 2221/033* (2013.01); *G06F 2221/2101* (2013.01); *G06F 2221/2115* (2013.01)

(58) Field of Classification Search
CPC . H04L 63/1425; H04L 63/1441; G06F 21/53; G06F 21/566; G06F 2221/2115; G06F 2221/2101; G06F 2221/033
See application file for complete search history.

(56) References Cited

U.S. PATENT DOCUMENTS 7,634,808 B1 * 12/2009 Szor .................... H04L 63/1416 709/223
8,171,545 B1 5/2012 Cooley et al.
2010/0192223 A1 7/2010 Ismael et al.
2011/0219451 A1 * 9/2011 McDougal ............ G06F 21/562 726/23
2015/0082441 A1 3/2015 Gathala et al.
2016/0292417 A1 * 10/2016 Malik .................. G06F 21/562
2017/0116418 A1 * 4/2017 Shanmugavelayutham ............... G06F 21/566

FOREIGN PATENT DOCUMENTS

GB 2404262 A 1/2005

* cited by examiner

*Primary Examiner* — Nelson S. Giddins
(74) *Attorney, Agent, or Firm* — Soroker Agmon Nordman

(57) ABSTRACT

A system and method for interception of malicious files, the system comprising an agent component planted in a mail server; a protection server configured to communicate with the agent component, the protection server comprising a hardware processor configured to execute code instructions for: fetching by the agent component a file received at the mail server; generating a file execution record of at least a list of tuple addresses used by the fetched file; verifying validity of the tuple address types; and indicating that a file is suspicious in case a tuple address is not valid.

18 Claims, 3 Drawing Sheets

100

Database 16
Process Count 162
Modules 164
Tuples 166

Protection Server 10
Processor 12
Translation Engine 13
Memory 14

Protected network 60
Agent 18
Mail server 20

SYSTEM AND METHOD FOR INTERCEPTION OF MALICIOUS FILES

FIELD OF THE INVENTION

Some embodiments of the present invention pertain to a cyber security system, and more specifically to multi-environment e-mail security abilities.

BACKGROUND

Some known security system and methods provide a service of scanning e-mail messages and/or attachments in order to alert users against potentially hazardous content.

Some of these systems have a significant amount of false positives and false negatives, i.e. the ability of these systems to classify between safe and unsafe content is limited and may cause damage to the users. Additionally, such systems are usually designated for a specific operating system, specific device specific types of attacks and/or specific types of files, and thus lack flexibility and cannot provide a complete solution to an organization, which may use various types of equipment and/or software and may need a protection from various kinds of malicious files.

SUMMARY

An aspect of some embodiments of the present invention provides a system for interception of malicious files, the system including: an agent component planted in a mail server; a protection server configured to communicate with the agent component, the protection server including a hardware processor configured to execute code instructions for fetching by the agent component a file received at the mail server; generating a file execution record of at least a list of tuple addresses used by the fetched file; verifying validity of the tuple address types; and indicating that a file is suspicious in case a tuple address is not valid.

Optionally, the generation of the file execution record is by executing the fetched file and recording the list of tuple addresses used by the fetched file.

Optionally, the generation of the file execution record is further by parsing of text included in the file code.

Optionally, the file execution record includes a module name and/or address, and wherein the processor is configured to execute code instructions for comparing the module name and/or address to names and/or addresses stored in a database.

Optionally, the processor is configured to execute code instructions for identifying to which module a tuple address belongs and adjusting the tuple address according to an address offset of the module.

Optionally, the processor is configured to execute code instructions for preventing storage of a module in a same memory space as a previously unloaded module, by marking the memory space of the unloaded module as occupied.

Optionally, the file execution record includes a process count value, and wherein the processor is configured to execute code instructions for comparing the process count value to values stored in a database.

Optionally, the processor is configured to execute code instructions for verifying that a tuple address and/or a function pointed to matches a tuple address and/or a function name stored in a database.

Optionally, the processor is configured to execute code instructions for calculating an address of a call corresponding to a return instruction.

Optionally, the processor is configured to execute code instructions for executing the return instruction and monitoring whether the address reached after the return instruction is executed is the expected location pointed to by a corresponding tuple address.

Another aspect of some embodiments of the present invention provides a method for interception of malicious files, the method including: communicate with an agent component planted in a mail server agent component to fetch a file received at the mail server; generating a file execution record of at least a list of tuple addresses used by the fetched file; verifying validity of the tuple address types; and indicating that a file is suspicious in case a tuple address is not valid.

Optionally, the generation of the file execution record is by executing the fetched file and recording the list of tuple addresses used by the fetched file.

Optionally, the generation of the file execution record is further by parsing of text included in the file code.

Optionally, the file execution record includes a module name and/or address, and the method includes comparing the module name and/or address to names and/or addresses stored in a database.

Optionally, the method includes identifying to which module a tuple address belongs and adjusting the tuple address according to an address offset of the module.

Optionally, the method includes preventing storage of a module in a same memory space as a previously unloaded module, by marking the memory space of the unloaded module as occupied.

Optionally, the file execution record includes a process count value, and the method includes comparing the process count value to values stored in a database.

Optionally, the method includes verifying that a tuple address and/or a function pointed to matches a tuple address and/or a function name stored in a database.

Optionally, the method includes calculating an address of a call corresponding to a return instruction.

Optionally, the method includes executing the return instruction and monitoring whether the address reached after the return instruction is executed is the expected location pointed to by a corresponding tuple address.

BRIEF DESCRIPTION OF THE DRAWINGS

Some non-limiting exemplary embodiments or features of the disclosed subject matter are illustrated in the following drawings.

In the drawings.

Figure 1:
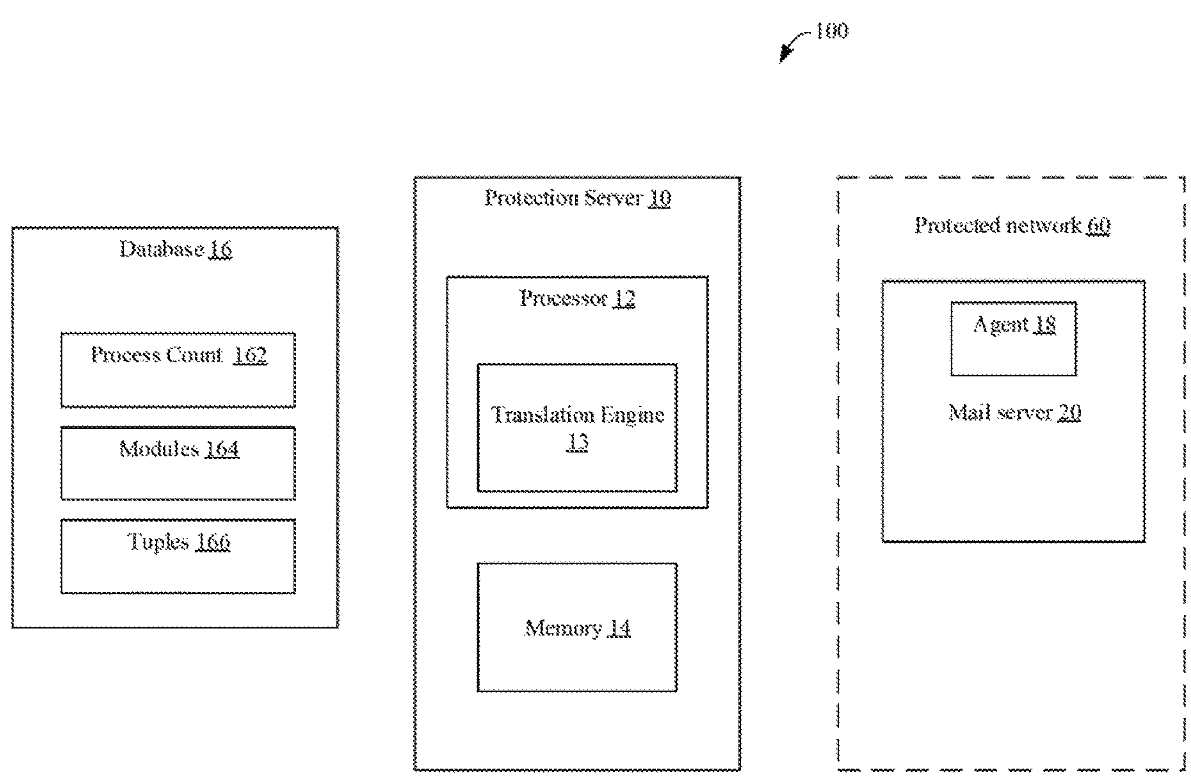
FIG. 1 is schematic illustration of a system for interception of malicious files, according to some embodiments of the present invention.

With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Identical or duplicate or equivalent or similar structures, elements, or parts that appear in one or more drawings are generally labeled with the same reference numeral, optionally with an additional letter or letters to distinguish between similar entities or variants of entities, and may not be repeatedly labeled and/or described. References to previously presented elements are implied without necessarily further citing the drawing or description in which they appear.

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

DETAILED DESCRIPTION

Some embodiments of the present invention may provide a system and method for multi-environmental e-mail security, i.e. with the ability to secure efficiently various types of environments and from various types of malicious files and/or cyber-attacks.

The system and method provided by some embodiments of the present invention enables alerting against most of the known attack types in most the known software applications and operating systems, with a tiny amount or almost none of false positives and false negatives. The flexibility of the provided system and method is enabled by smart identification of suspicious code instructions embedded in the file, specifically instructions pointing to operating system modules.

Thus, the provided system and method facilitates a complete secured-mail solution, highly desirable by private users as well as by multi-environment organizations, which may use various types of equipment and/or software.

Some embodiments of the present invention may include a system, a method, and/or a computer program product. The computer program product may include a tangible non-transitory computer readable storage medium (or media) having computer readable program instructions thereon for causing a processor to carry out aspects of the present invention. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including any object oriented programming language and/or conventional procedural programming languages.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 2:
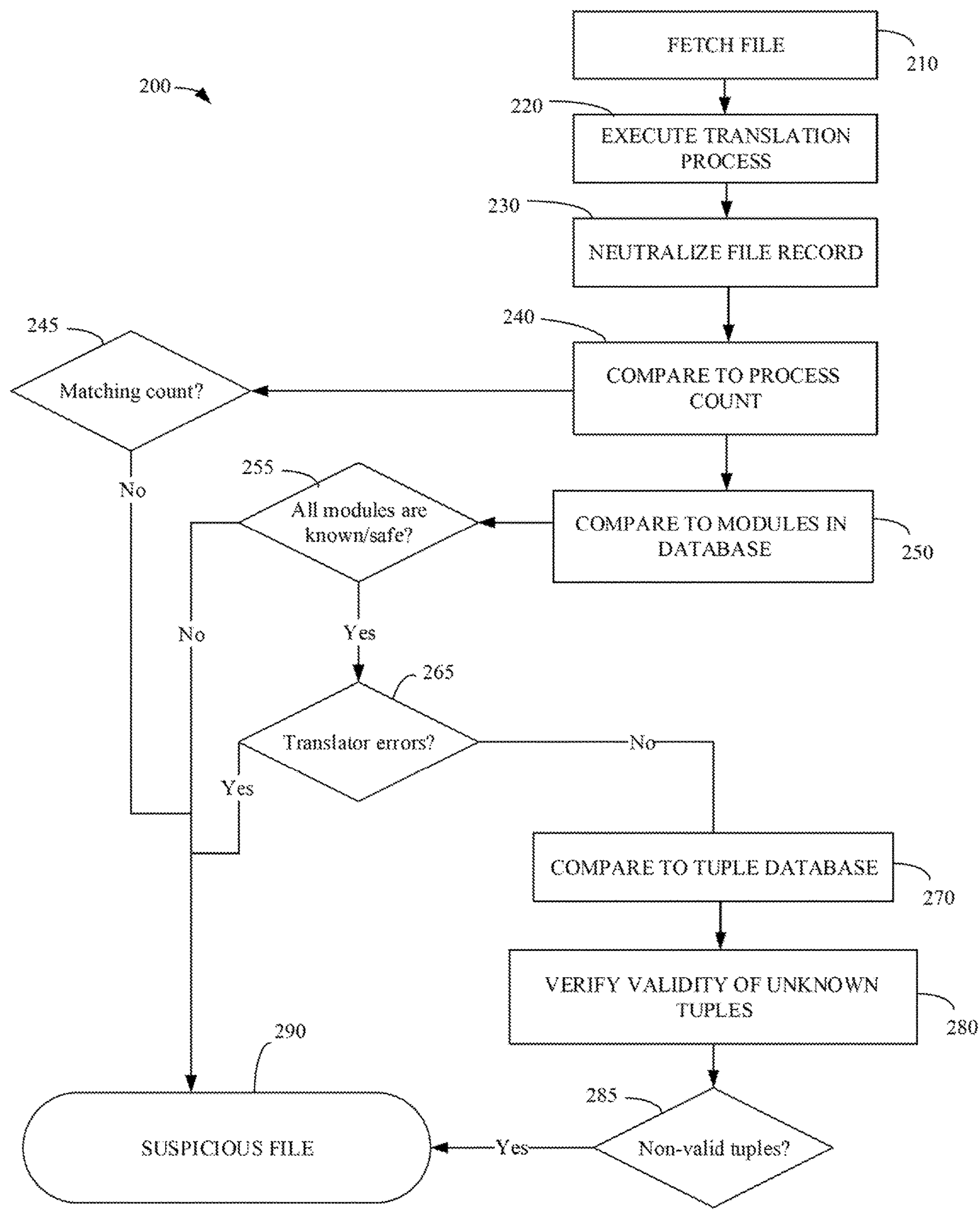
FIG. 2 is a schematic flowchart illustrating a method for interception of malicious files, according to some embodiments of the present invention.

Reference is now made to FIG. 1, which is a schematic illustration of a system 100 for interception of malicious files, according to some embodiments of the present invention. Further reference is now made to FIG. 2, which is a schematic flowchart illustrating a method 200 for interception of malicious files, according to some embodiments of the present invention. In some embodiments of the present invention, system 100 includes a protection server 10 and an agent software and/or hardware component 18 planted at a mail server 20. For example, mail server 20 is included in a protected network 60. As indicated in block 210, protection server 10 may be configured to fetch files received at mail server 20, for example files received from outside protected network 60, and to identify which of the files are suspected as malicious files, as described in detail herein. The fetched files may be of various types such as documents, slideshows, drawings and/or media files, and may be suitable for execution by various corresponding software applications. For example, agent 18 may be a non-transitory storage medium storing instructions executable by the mail server. For example, agent 18 may include and/or store an instruction to port-forward a communication to protection server 10, an instruction to send a copy of the communication to protection server 10, an Internet Content Adaptation Protocol (ICAP), an application programming interface (API), and/or any other suitable tool.

Protection server 10 may include at least one hardware processor 12 and a non-transitory memory 14. Processor 12 may be configured to execute code instructions, for example code instructions stored in a non-transitory memory 14. In some embodiments, memory 14 stores code instructions that causes processor 12 to carry out the methods described herein, upon execution of the code instructions by processor 12. Processor 10 may control and/or communicate with agent 18 by any suitable wired and/or wireless communication link and/or network.

In some embodiments of the present invention, system 100 includes a whitelist database 16, which may store data about known file types and/or file components. For example, known file types are files that include safe components, and/or include each of the file components in a safe configuration, order and/or amount, wherein the term safe means standard and/or verified. According to some embodiments of the present invention, database 16 is created by parsing and/or recording processes of file execution by corresponding software applications, by which processor 12 may learn and/or store in database 16 features of known file types and/or file components and/or file execution parameters. Accordingly, for example, database 16 may include a process count database 162 configured to store safe process count numbers in relation to execution of respective file types, each of the process count numbers representing a safe number of appearances of a certain process in execution of a certain file or file type. For example, database 16 may include a module database 164 configured to store safe modules. For example, database 16 may include a tuple database 166 configured to store safe function address tuples. A function address tuple may include, for example, a TO address, i.e. an address of a beginning of a function, also called herein a TO module, in a process memory space, and a FROM address, i.e. an address of a code instruction or function, also called herein a FROM module, directing to the function. It will be appreciated that throughout the present disclosure, the term "module" means a function or a cluster of functions and the terms "function" and "module" are used interchangeably.

In some embodiments of the present invention, processor 12 may analyze and/or gather data about files fetched at mail server 20. For example, processor 12 analyzes a file to detect whether the file includes suspicious code components that may be vulnerable for attacks, for example by comparing the file features to features stored in database 16. For example, processor 12 detects whether a file includes vulnerable processes, modules and/or tuples, and mark such components and/or the file as suspicious. For example, processor 12 detects whether the file includes excess appearances of a certain process, unknown modules and/or function address tuples, tuples that include an irregular or unknown address, and/or other suspicious features.

As indicated in Block 220, processor 12 may execute a translation process by translation engine 13. Translation engine 13 enables execution of a fetched file, and specifically code instructions that relate to functions of the Operating System (OS). In some embodiments, translation engine 13 extracts from and/or during the file execution and records processes, modules and function address tuples used by processor 12 in executing a file, including OS function addresses the file points to or OS function addresses that point to locations in the file. Thus, for example, translation engine 13 generates a file execution record including, for example, a list of absolute tuple addresses and a list of module base addresses, and/or any other suitable data, as described in more detail herein.

Translation engine 13 may identify code instructions that point to an OS shared library function when a file is executed by a software application. A file may include various kinds of instructions to point to an OS shared library function, such as an instruction to jump or call to an exported or inner OS shared library function, a callback instruction and/or instruction to return to a called OS shared library function. In some embodiments, by executing a file, translation engine 13 identifies code instructions that cause OS functions to point to locations in the file, and/or identifies addresses of such code instructions. As a result of the translation process, processor 12 may generate the file execution record of a corresponding file, the execution record may include processes, modules and/or function address tuples identified and/or extracted from and/or during the file execution.

For example, by translation engine 13, processor 12 may receive a list of function address tuples used in the file execution, each is related to a certain kernel process and may include an absolute address that represent the location of the corresponding OS function in the process memory space. Processor 12 needs to identify the module and the module base address, to which the tuple belongs.

In some embodiments of the present invention, processor 12 executes a debugger in parallel to execution of the file, which generates an alert each time a module is loaded, thus enabling processor 12 to record the module base address.

This method holds a problem, since the list of tuples are received after the execution has finished, wherein modules were loaded and unloaded during this period. For example, in an end of a file execution, processor 12 may get a list of tuples with absolute addresses, and a list of modules with their base address, and a method for identifying which tuple addresses belong to which modules is required. For example, processor 12 may prevent storage of a module in a same memory space as a previously unloaded module, by marking the memory space of the unloaded module as occupied. Thus, for example, another base address may be kept in relation to each loaded module, which may enable processor 12 to identify, according to the absolute addresses, which tuples belong to each module. For example, processor 12 may obtain and/or monitor a Process Environment Block (PEB) that includes a list of all currently loaded modules and their corresponding base addresses. Once a module is unloaded, processor 12 may mark the base address of the unloaded module as occupied rather than free.

An address of a module such as a shared library function, for example within a shared library, may be varied between OS versions. An OS shared library may be, for example, a Dynamic-Link Library (DLL), which may store shared library functions. Throughout the present description, an OS shared library function is also called an OS function.

As indicated in Block 230, processor 12 may neutralize the file execution record from variant characteristics that may be caused by file and/or OS configurations specific to an OS type and/or version. For example, the features stored in database 16 may correspond a certain OS type and/or version, and/or processor 12 may adapt features of the file execution record to the certain OS type and/or version, for example in order to facilitate comparison between features of the file execution record to features stored in database 16. In some embodiments of the present invention, in order to neutralize a file execution record, processor 12 adapts the file execution record for comparison with features stored in database 16, for example as described in detail herein.

In some embodiments of the present invention, processor 12 is configured to identify, in the file execution record, code instruction to point to an OS function. For example, processor 12 is configured to identify code instruction to jump or call to an exported OS function. Usually, an instruction to jump or call to an exported function specifies the function name. In order to neutralize the file execution record from a specific address of an OS function, which may vary between different OS types and/or versions, processor 12 may compare between the specified function name and the name indicated in database 16, for example while disregarding the address of the OS function.

For example, processor 12 is configured to identify code instruction to jump or call to an inner OS function, for example when execution of an OS function includes references to other OS functions. Although inner functions may not be indicated by name in the file execution record, the file execution record includes a function address tuple and/or address of the inner function, which processor 12 have to approach during the execution. In some embodiments, processor 12 loads into database 16 function names and address offsets of OS functions from related debugging files, such as program database (PDB) files of OS functions.

In case processor 12 identifies in the file execution record an OS function address, for example of an inner OS address, processor 12 may fetch debugging files of the identified OS function, for example from an online service of OS such as, for example, the Windows Symbol Server online. The debugging files fetched online may include the address offset and the name of the identified OS function, which processor 12 may verify in comparison to an address offset and corresponding name stored in database 16, for example in order to neutralize the file execution record from the specific address of the inner OS function. In order to verify the address offset and name found in the online debugging files, processor 2 may verify that the stored address offset, adjusted by the offset found in the online debugging files, point to a start of an OS function, and that the name of this OS function matches the corresponding name stored in database 16.

By neutralizing the file execution record from the specific addresses of the inner OS function, some embodiments of the present invention may enable analysis of the file execution record on another machine from the machine on which it is generated, even if the other machine has a different OS type and/or version. By neutralizing the file execution record from the specific addresses of the inner OS function, some embodiments of the present invention may enable generation and analysis of the file execution record on another machine from the machine on which database 16 is generated, even if the other machine has a different OS type and/or version.

As indicated in block 240, processor 12 may compare a number of occurrences of a process in the file execution record, to a corresponding process count stored in process count database 162. An occurrence of a process may include, for example, loading of an executable file. For example, process count database 162 may store for each process a representing value such as a hash value of the executable file, along with a corresponding count value representing a number of time the executable file is loaded during execution of a file similar to the fetched file, for example a file executed by a similar or same software application.

As indicated in block 245, processor 12 may check if all the numbers of occurrences of processes in the file execution record match corresponding process counts stored in database 162. As indicated in block 290, in case a number of occurrences of a process in the file execution record does not match a corresponding process count stored in database 162, processor 12 may mark the file as suspicious.

As indicated in block 250, processor 12 may compare the modules identified in the file execution record to the modules stored in module database 164. As indicated in block 255, processor 12 may check if all the modules identified in the file execution record match modules stored in module database 164. As indicated in block 290, in case a module identified in the file execution record does not match a module stored in module database 164, processor 12 may mark the file as suspicious, for example unless the module is an OS function, for example identified by the function name and/or address. In some embodiments of the present invention, in case a module identified in the file execution record is an OS function, processor 12 loads into database 16 the function name and address offset of the OS functions from related debugging files, such as a PDB file of the OS function, for example in order to enable address validations of inner OS functions, as described in detail herein.

As indicated in block 265, in case the identified modules are known from database 16 and/or safe, for example identified as OS functions, processor 12 may check if the file execution record indicates translation errors, e.g. processes that crashed or caused a long-run error. In case the file execution record indicates translation errors, as indicated in block 290, processor 12 may mark the file as suspicious.

As indicated in block 270, for example in case no translation errors are indicated, processor 12 may compare the tuples identified in the file execution record to tuples stored in tuple database 166. In case all the tuples identified in the file execution record match tuples stored in tuple database 166, processor 12 may mark the corresponding file as valid.

As indicated in block 280, processor 12 may check validity of unknown tuples, e.g. tuples not yet stored in database 166. In case there is an invalid tuple, as indicated in block 290, processor 12 may mark the file as suspicious In some embodiments, in order to validate a tuple (FROM, TO), processor 12 determines the types of the TO address and the FROM address of the tuple. For example, in order to validate a tuple, processor 12 may be required to determine whether a tuple address is of a known type, wherein a known address type is one of or a combination of the following address types: Call, Jump, Ret, Start-of-function and After-call. For example, a tuple (FROM, TO) may include (Call, Start-of-function), (Jump, Start-of-function) or (Ret, After-call). Database 166 and/or the file execution record may include with relation to a tuple (FROM, TO), in addition to the TO and FROM addresses, an identification, a name and/or a hash value of the corresponding TO and FROM modules. Database 166 may include, with relation to a known tuple (FROM, TO), the corresponding address types.

In some embodiments of the present invention, processor 12 may find the FROM address type in database 16 and/or by disassembling the corresponding portion and/or code included in the file execution record. For example, in case the offset address of the FROM module is stored in database 16, i.e. it is a known address, database 16 may also include the corresponding address type. In case the address is not stored in database 16, processor 12 may disassemble the file execution record in order to extract the address type. For example, processor 12 determines that the address type is Call, if the file execution record includes a code instruction to call a function, for example specifying where the address of the function is stored. For example, processor 12 determines that the address type is Jump, if the file execution record includes a code instruction to jump to a function, for example specifying where the address of the function is stored. For example, processor 12 determines that the address type is Ret, if the file execution record includes a code instruction to return to a function. For example, processor 12 determines that the address type is Start-of-function, if the respective code location is identified as a start of a function. For example, processor 12 determines that the address type is After-call, if the address point to a code location that is after a call instruction.

In some embodiments of the present invention, processor 12 may find the TO address type depending on the corresponding FROM address. For example, if the type of the FROM address is Ret, processor 12 disassembles the code included in the file execution record in order to find the type of the TO address. For example, processor 12 may incrementally disassemble bytes previous to the TO address to verify that the previous instruction was a call. For example, if the TO address is at 0x1000, processor 12 may go to to 0x998 and disassemble 2 bytes, than go to 0x997 and disassemble 3 bytes and so on up until 8 bytes, which is the maximum size of a call instruction. For example, processor 12 determines if the TO location address is a start of a function, i.e. Start-of-function address type. For example, processor identifies an explicit TO location address in the file execution record, and can determine the address type accordingly. In some embodiments, for example in case the TO address is an address of an OS function, processor 12 determines the type of the TO address, i.e. if it is a start of a function and/or an after call address, according to data stored in database 16 about the OS function address, such as data loaded from online accessible debugging files.

Figure 3:
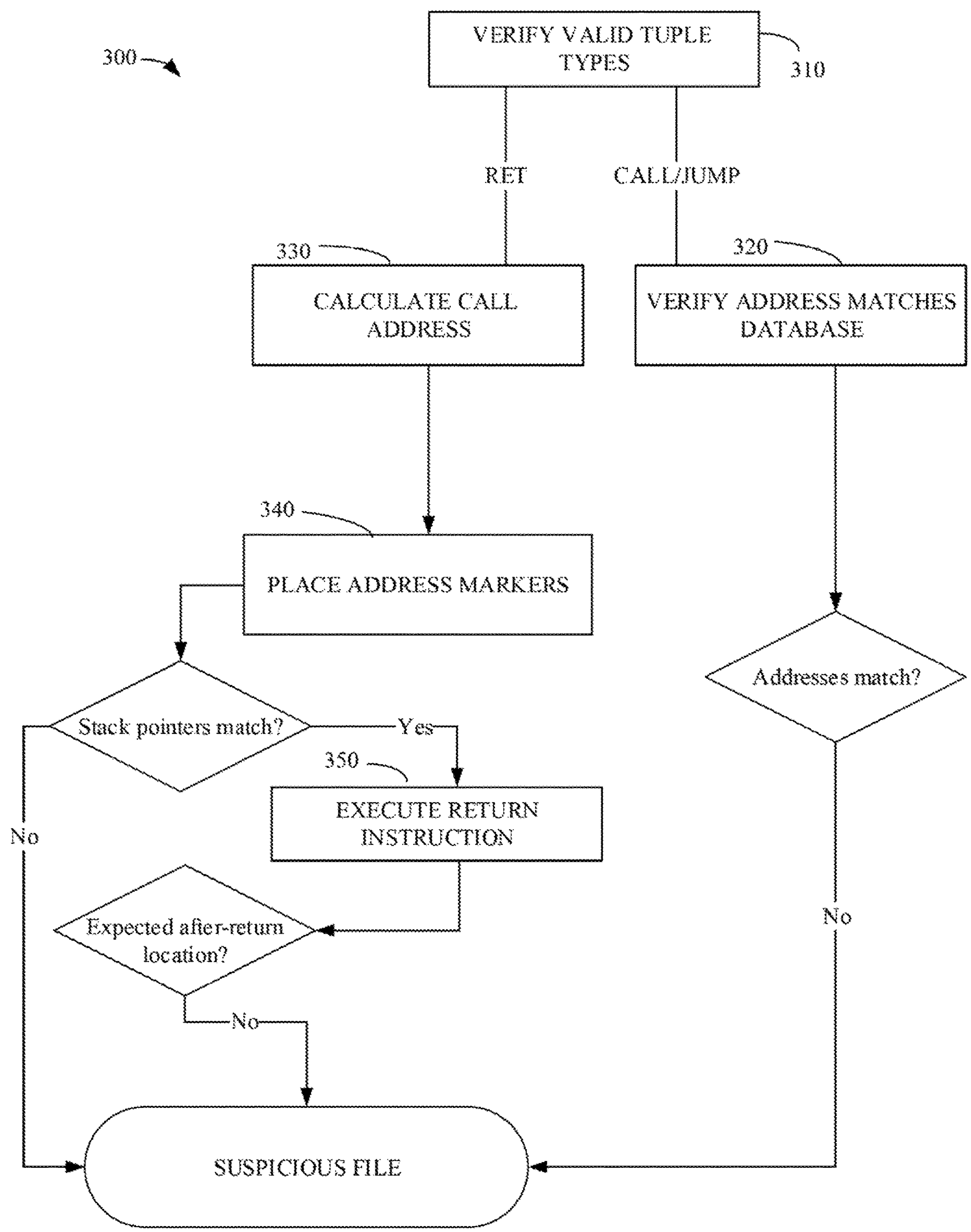
FIG. 3 is a schematic flowchart illustrating a method for validating an address tuple, according to some embodiments of the present invention.

Reference is now made to FIG. 3, which is a schematic flowchart illustrating a method 300 for validating an address tuple, according to some embodiments of the present invention. In order to validate a tuple, as described in detail herein, processor 12 may determine the address tuple type. As indicated in block 310, processor 12 may verify that all the tuples are of type (Call, Start-of-function), (Jump, Start-of-function) or (Ret, After-call). In case at least one of the tuples is not of one of these types, processor 12 may mark the file as suspicious.

As indicated in block 320, in case of a tuple (Call, Start-of-function) or (Jump, Start-of function), processor 12 may verify that the TO addresses and/or functions pointed to by the Call or Jump code instructions match a predefined set of addresses and/or function names stored in database 16. In case the code instructions points to addresses and/or functions that don't match a predefined set of addresses and/or function names stored in database 16, processor 12 may processor 12 may mark the file as suspicious.

In case the TO address points to an OS function and/or an exported function, processor 12 may verify that a name of the exported function matches a function name indicated in or pointed to from the FROM address, if a function name is indicated in the FROM address, and/or may verify that a name of the exported function matches a function name indicated in a corresponding record of database 16 in relation to the FROM address, if such and/or name record exists. For example, such function name may be indicated in the FROM address and/or a corresponding record generated in the translation process, for example by parsing of the corresponding code instructions. In some embodiments, if no corresponding record exists in database 16, the name of the OS and/or exported function is recorded in database 16 in relation to the FROM address.

For example, in case the type of the FROM address is of type Call or Jump, processor 12 may search the TO address in database 16 to see if the TO address points to a beginning of a function. As described in detail herein, database 16 may be created by parsing and/or recording processes of file execution by corresponding software applications, by which processor 12 may learn and/or store in database 16 features of known file types and/or file components and/or file execution parameters.

Accordingly, database 16 may include a table of identified start-of-function addresses, i.e. addresses that point to starts of functions. Start-of-function addresses may be extracted by processor 12, for example, from parsed relocation table of an executed file and stored in database 16. In some embodiments, start-of-function addresses are extracted by processor 12 by parsing the text section of an executed file, and/or getting addresses pointed to by direct calls and/or pointing to exported functions. In some embodiments, start-of-function addresses are extracted by processor 12 from debugging files, such as PDB files of OS function.

As indicated in block 330, in case of a tuple (Ret, After-call), processor 12 may calculate the address of the call corresponding to the return instruction. In some embodiments of the present invention, processor 12 scans the file code backwards from the return instruction, until reaching the call instruction. As mentioned above in case the return instruction is not after a corresponding call instruction, processor 12 marks the file as suspicious.

As indicated in block 340, processor 12 may place a couple of address markers such as, for example, base pointers, a first one at the call instruction and a second one at the TO address. The address markers may be configured to trigger processor 12 to store a stack pointer of the called function when the first address marker is hit, and compare it to a current stack pointer when the second address marker is hit, i.e. at the TO address, which should have the same stack pointer of the called function. In case the stack pointers do not match, processor 12 may mark the file as suspicious, for example with a suspected return-oriented programming (ROP).

As indicated in block 350, processor 12 may execute the return instruction and monitor whether the address reached after the return instruction is executed is the expected location pointed to by the TO address. In case it is not the expected location, processor 12 may mark the file as suspicious.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary context of the art, such as a general purpose processor, or a portable device such as a smart phone or a tablet computer, or a micro-processor, or a RISC processor, or a DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or electronic circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry. The processor and program may constitute the same apparatus, at least partially, such as an array of electronic gates, such as FPGA or ASIC, designed to perform a programmed sequence of operations, optionally comprising or linked with a processor or other circuitry.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function (s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprising", "including" and/or "having" and other conjugations of these terms, when used in this specification, specify the presence of stated features, integers, steps, operations, elements, and/or components, but do not preclude the presence or addition of one or more other features, integers, steps, operations, elements, components, and/or groups thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A system for interception of malicious files, the system comprising:

an agent component planted in a mail server;

a protection server configured to communicate with the agent component, the protection server comprising a hardware processor configured to execute code instructions for:

fetching by the agent component a file received at the mail server;

generating a file execution record of at least a list of tuple addresses used by the fetched file;

verifying validity of the tuple address types; and indicating that a file is suspicious in case a tuple address is not valid, wherein the verifying further includes verifying that a tuple address and/or a function pointed to matches a tuple address and/or a function name stored in a database, and wherein a tuple address is comprised of: TO-address and FROM-address.

2. The system of claim 1, wherein the generation of the file execution record is by executing the fetched file and recording the list of tuple addresses used by the fetched file.

3. The system of claim 2, wherein the generation of the file execution record is further by parsing of text included in the file code.

4. The system of claim 1, wherein the file execution record includes a module name and/or address, and wherein the processor is configured to execute code instructions for comparing the module name and/or address to names and/or addresses stored in a database.

5. The system of claim 4, wherein the processor is configured to execute code instructions for identifying to which module a tuple address belongs and adjusting the tuple address according to an address offset of the module.

6. The system of claim 4, wherein the processor is configured to execute code instructions for preventing storage of a module in a same memory space as a previously unloaded module, by marking the memory space of the unloaded module as occupied.

7. The system of claim 1, wherein the file execution record includes a process count value, and wherein the processor is configured to execute code instructions for comparing the process count value to values stored in a database.

8. The system of claim 1, wherein the processor is configured to execute code instructions for calculating an address of a call corresponding to a return instruction.

9. The system of claim 8, wherein the processor is configured to execute code instructions for executing the return instruction and monitoring whether the address reached after the return instruction is executed is the expected location pointed to by a corresponding tuple address.

10. A method for interception of malicious files, the method comprising:

communicate with an agent component planted in a mail server agent component to fetch a file received at the mail server;

generating a file execution record of at least a list of tuple addresses used by the fetched file;

verifying validity of the tuple address types; and indicating that a file is suspicious in case a tuple address is not valid wherein the verifying further includes verifying that a tuple address and/or a function pointed to matches a tuple address and/or a function name stored in a database wherein a tuple address is comprised of: TO-address and FROM-address.

11. The method of claim 10, wherein the generation of the file execution record is by executing the fetched file and recording the list of tuple addresses used by the fetched file.

12. The method of claim 11, wherein the generation of the file execution record is further by parsing of text included in the file code.

13. The method of claim 10, wherein the file execution record includes a module name and/or address, and the method comprising comparing the module name and/or address to names and/or addresses stored in a database.

14. The method of claim 13, wherein the method comprising identifying to which module a tuple address belongs and adjusting the tuple address according to an address offset of the module.

15. The method of claim 13, wherein the method comprising preventing storage of a module in a same memory space as a previously unloaded module, by marking the memory space of the unloaded module as occupied.

16. The method of claim 10, wherein the file execution record includes a process count value, and wherein the method comprising comparing the process count value to values stored in a database.

17. The method of claim 10, wherein the method comprising calculating an address of a call corresponding to a return instruction.

18. The method of claim 17, wherein the method comprising executing the return instruction and monitoring whether the address reached after the return instruction is executed is the expected location pointed to by a corresponding tuple address.

* * * * *